(12) United States Patent
Kawai et al.

(10) Patent No.: US 12,742,049 B2
(45) Date of Patent: Sep. 22, 2026

(54) PHOTOCATALYTIC FILM AND DISPLAY DEVICE

(71) Applicant: SHARP KABUSHIKI KAISHA, Sakai City (JP)

(72) Inventors: Hidetsugu Kawai, Sakai City (JP); Yasuhiro Shibai, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 411 days.

(21) Appl. No.: 18/215,970

(22) Filed: Jun. 29, 2023

(65) Prior Publication Data

US 2024/0010808 A1 Jan. 11, 2024

(30) Foreign Application Priority Data

Jul. 6, 2022 (JP) ................................ 2022-109165

(51) Int. Cl.

| | |
|---|---|
| ***C08J 7/18*** | (2006.01) |
| ***C08J 7/04*** | (2020.01) |
| ***C09D 5/03*** | (2006.01) |
| ***C09D 7/40*** | (2018.01) |
| ***C09D 7/61*** | (2018.01) |
| ***C09D 7/63*** | (2018.01) |

(52) U.S. Cl.

CPC ................ *C08J 7/18* (2013.01); *C08J 7/042* (2013.01); *C08J 7/0427* (2020.01); *C09D 5/033* (2013.01); *C09D 7/61* (2018.01); *C09D 7/63* (2018.01); *C09D 7/67* (2018.01); *C08J 2300/104* (2013.01); *C08J 2367/02* (2013.01); *C08J 2400/104* (2013.01); *C08J 2400/108* (2013.01)

(58) Field of Classification Search

None

See application file for complete search history.

(56) References Cited

U.S. PATENT DOCUMENTS

| | | | | |
|---|---|---|---|---|
| 6,337,129 B1 * | 1/2002 | Watanabe | ............... | F28F 19/04 502/343 |
| 2003/0096119 A1 * | 5/2003 | Kimura | .................... | C08J 7/044 428/412 |
| 2012/0237396 A1 | 9/2012 | Miki et al. | | |
| 2014/0004331 A1 | 1/2014 | Hida et al. | | |
| 2021/0139660 A1 | 5/2021 | Ihara et al. | | |

(Continued)

FOREIGN PATENT DOCUMENTS

| | | |
|---|---|---|
| CA | 2256895 A1 | 12/1997 |
| CN | 103547645 A | 1/2014 |
| CN | 109689800 A | 4/2019 |

(Continued)

OTHER PUBLICATIONS

Translation of Ono et al., JPH11347418 A (Year: 1999).*

*Primary Examiner* — David Sample
(74) *Attorney, Agent, or Firm* — ScienBiziP, P.C.

(57) ABSTRACT

A photocatalytic film according to the present disclosure includes a base film, a hard coat layer placed on the base film, and a photocatalytic coat layer placed on the hard coat layer, and is characterized in that the hard coat layer contains an ultraviolet-curable resin, the photocatalytic coat layer contains photocatalytic particles and a binder, the photocatalytic particles are tungsten oxide particles, and the binder is composed of a tetraalkoxysilane hydrolyzed condensate.

12 Claims, 3 Drawing Sheets

(56) References Cited

U.S. PATENT DOCUMENTS

2021/0371615 A1* 12/2021 Tian .................... C09D 5/1675

FOREIGN PATENT DOCUMENTS

| | | | | |
|---|---|---|---|---|
| JP | H11-347418 A | 12/1999 | | |
| JP | 2011-111600 A | 6/2011 | | |
| JP | 2021-059734 A | 4/2021 | | |
| WO | 97/045502 A1 | 12/1997 | | |
| WO | WO-2012176665 A1 * | 12/2012 | ............ | G09F 13/22 |

* cited by examiner

FIG. 3A

OR
RO-Si-OR + $H_2O$ ⟶ RO-Si-OH + ROH
OR

PHOTOCATALYTIC FILM AND DISPLAY DEVICE

BACKGROUND OF THE INVENTION

Field of the Invention

The present disclosure relates to a photocatalytic film and a display device.

Description of the Background Art

When a photocatalyst receives light, a photocatalytic activity occurs. This photocatalytic activity can remove harmful substances in air, such as VOC (volatile organic compounds) and inactivate allergens in the prior art. In the prior art, a tetraalkoxysilane hydrolyzed condensate is used as a binder for a photocatalytic coating layer. Use of such a binder makes it possible to suppress oxidative degradation of the binder due to photocatalytic activity.

Also, optical films to be attached to a display are known in the prior art.

After the hydrolysis reaction and the dehydration condensation reaction have sufficiently proceeded, the tetraalkoxysilane hydrolyzed condensate becomes $SiO_2$. Thereby, a photocatalytic coat layer containing the tetraalkoxysilane hydrolyzed condensate as a binder may crack and partially peel off due to reduced toughness. Thus, the photocatalytic coat layer is prone to scratch. The present disclosure was made in view of the above circumstances to provide a photocatalytic film excellent in scratch resistance.

SUMMARY OF THE INVENTION

The present disclosure provides a photocatalytic film that includes a base film, a hard coat layer placed on the base film, and a photocatalytic coat layer placed on the hard coat layer, and is characterized in that the hard coat layer contains an ultraviolet-curable resin, the photocatalytic coat layer contains photocatalytic particles and a binder, the photocatalytic particles are tungsten oxide particles, and the binder is composed of a tetraalkoxysilane hydrolyzed condensate.

Since the photocatalytic coat layer contains photocatalytic particles, the photocatalytic film can acquire an excellent photocatalytic activity and an antibacterial/antiviral activity.

The binder contained in the photocatalytic coat layer is composed of a tetraalkoxysilane hydrolyzed condensate, and since this binder is an inorganic binder, the binder can be prevented from decomposing due to photocatalytic activity. Thereby, the photocatalytic film can maintain the scratch resistance and the antibacterial/antiviral properties over a long period of time.

The photocatalytic film according to the present disclosure has the hard coat layer containing the ultraviolet-curable resin between the base film and the photocatalytic coat layer. Consequently, the photocatalytic coat layer can be prevented from peeling off from the photocatalytic film, and the toughness of the hard coat layer can prevent the photocatalytic coat layer from cracking and partially peeling off, so that the photocatalytic film can acquire excellent scratch resistance.

BRIEF DESCRIPTION OF THE DRAWINGS

FIGS. 3A and 3B each illustrate a chemical reaction formula for a hydrolysis reaction and a condensation reaction of tetraalkoxysilane.

DESCRIPTION OF THE PREFERRED EMBODIMENTS

Figure 1:
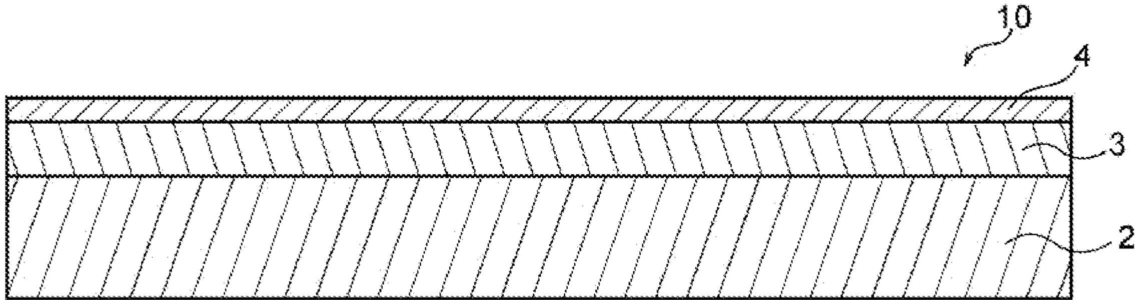
FIG. 1 is a schematic sectional view illustrating a photocatalytic film according to an embodiment of the present disclosure.

The photocatalytic film according to the present disclosure includes a base film, a hard coat layer placed on the base film, and a photocatalytic coat layer placed on the hard coat layer, and is characterized in that the hard coat layer contains an ultraviolet-curable resin, the photocatalytic coat layer contains photocatalytic particles and a binder, the photocatalytic particles are tungsten oxide particles, and the binder is composed of a tetraalkoxysilane hydrolyzed condensate.

The hard coat layer preferably contains an ultraviolet-curable resin and inorganic particles, and a weight proportion of the inorganic particles in the hard coat layer is preferably 5 wt % or higher and 50 wt % or lower. This weight proportion makes it possible to increase the hardness of the hard coat layer and increase transparency of the photocatalytic film.

The inorganic particles are preferably composed of silica. Thereby, an adhesiveness between the hard coat layer and the photocatalytic coat layer can be improved.

Preferably, the inorganic particles have an average particle diameter D50 of 5 nm or larger and 80 nm or smaller. This average particle diameter allows the photocatalytic film to acquire an excellent transparency.

Preferably, the inorganic particles are at least one of copper compound particles, silver particles, or silver compound particles. This makes it possible to improve the antiviral activity of the photocatalytic film.

Preferably, the ultraviolet-curable resin has a hydroxyl group. Thereby, an adhesiveness between the hard coat layer and the photocatalytic coat layer can be improved.

Preferably, the ultraviolet-curable resin contains a polymerization initiator, and the polymerization initiator is based on an acylphosphine oxide. When the hardening reaction of the ultraviolet-curable resin is initiated, an acid is generated as a byproduct by using the acylphosphine oxide-based polymerization initiator. This acid acts to improve the hardenability of the photocatalytic coat layer, so that the scratch resistance of the photocatalytic film can be improved. This acid also improves the antibacterial/antiviral properties of the photocatalytic film.

Preferably, the hard coat layer has a thickness of 1 μm or larger and 10 μm or smaller. This thickness allows the photocatalytic film to acquire excellent scratch resistance and flexibility, and suppresses cracking of the hard coat layer and increase in haze.

Preferably, the photocatalyst particles have an average particle diameter D50 of 10 nm or larger and 5000 nm or smaller. This average particle diameter makes it possible to suppress increase in the haze of the photocatalytic film.

Preferably, the hydrolyzed condensate is a long-chain siloxane compound. Thereby, it is possible to suppress increase in the viscosity of the photocatalytic coating agent used for forming the photocatalytic coat layer. Consequently, the surface roughness of the photocatalytic coat layer formed can be reduced, and increase in the haze of the photocatalytic film containing this photocatalytic coat layer can be suppressed.

Preferably, the photocatalytic coat layer contains a fluororesin. Thereby, the surface smoothness (flowability) of the photocatalytic coat layer can be improved, and the haze can be reduced even when a ratio of the photocatalytic particles in the photocatalytic coat layer is high and an antiviral activity value is high. Furthermore, the scratch resistance (printing durability) of the photocatalytic coat layer can be improved.

Preferably, the photocatalytic coat layer has a thickness of 0.1 μm or larger and 5.0 μm or smaller. This thickness makes it possible to increase the photocatalytic activity of the photocatalytic coat layer and to suppress increase in the haze of the photocatalytic film. The display device according to the present disclosure includes the photocatalytic film according to the present disclosure.

An embodiment of the present disclosure will be explained below with reference to the figures. The configurations illustrated in the figures or the description below are illustrative, and the scope of the disclosure is not limited to the figures or the description below.

Figure 2:
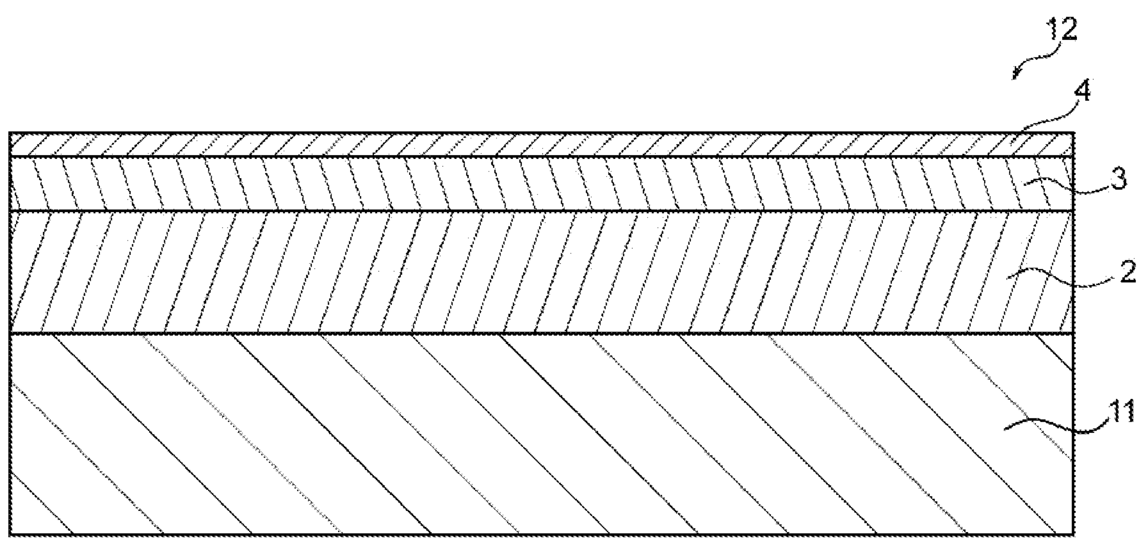
FIG. 2 is a schematic sectional view illustrating a display device according to an embodiment of the present disclosure.

FIG. 1 is a schematic sectional view illustrating the photocatalytic film according to the present embodiment. FIG. 2 is a schematic sectional view illustrating the display device according to the present embodiment.

The photocatalytic film 10 according to the present embodiment includes a base film 2, a hard coat layer 3 placed on the base film 2, and a photocatalytic coat layer 4 placed on the hard coat layer 3, and is characterized in that the hard coat layer 3 contains an ultraviolet-curable resin, the photocatalytic coat layer 4 contains photocatalytic particles and a binder, the photocatalytic particles are tungsten oxide particles, and the binder is composed of a tetraalkoxysilane hydrolyzed condensate.

The photocatalytic film 10 can be used as an antibacterial/antiviral film to be attached to a display.

A display device 12 is e.g. a liquid crystal display, an organic EL display, or the like. The display device 12 may also be a touch panel display. The display device 12 may be an operation panel built into an apparatus such as a multifunction peripheral, or may be a smartphone display.

The display device 12 can be manufactured e.g. by attaching the photocatalytic film 10 to a displayer 11.

The base film 2 serves as a base for the photocatalytic film 10. The base film 2 is e.g. an optical film such as a PET film, a triacetate cellulose film, a cycloolefin polymer film, or a urethane resin film. The base film 2 may be a translucent resin film.

The hard coat layer 3 is placed between the base film 2 and the photocatalytic coat layer 4 and has a function of preventing scratch of the photocatalytic film 10. The hard coat layer 3 contains an ultraviolet-curable resin. Thereby, the hard coat layer 3 can be prevented from peeling off from the base film 2. The hard coat layer 3 may be a resin layer.

The hard coat layer 3 has a thickness of 1 μm or larger and 10 μm or smaller, preferably 2 μm or larger and 8 μm or smaller, more preferably 3 μm or larger and 6 μm or smaller. This thickness makes it possible to improve the scratch resistance and the flexibility of the photocatalytic film 10, and to suppress cracking of the hard coat layer 3 and increase in haze.

In the ultraviolet-curable resin, a crosslinked structure is formed by a reaction between polymerizable oligomers/monomers having vinyl groups, acryloyl groups, epoxy groups, or the like, using, as initiating seeds, radicals and cations generated by light (ultraviolet) irradiation. The ultraviolet-curable resin may be a radical polymerization type resin or a cationic polymerization type resin.

The ultraviolet-curable resin may contain a polymerization initiator. For example, the polymerization initiator is based on acylphosphine oxide. Use of this initiator generates an acid as a byproduct when the hardening reaction of the ultraviolet-curable resin is initiated. This acid acts to improve the hardenability of the photocatalytic coat layer 4 to improve the scratch resistance of the photocatalytic film 10. Also, this acid improves the antibacterial/antiviral properties of the photocatalytic film 10.

Preferably, the ultraviolet-curable resin has a hydroxyl group. Thereby, the adhesiveness between the hard coat layer 3 and the photocatalytic coat layer 4 can be improved. Specifically, the binder and the ultraviolet-curable resin can be chemically bonded by a dehydration condensation reaction between a hydroxyl group generated by hydrolysis of a residual alkoxy group (—OR) of the hydrolyzed condensate (binder) contained in the photocatalytic coat layer 4 and a hydroxyl group of the ultraviolet-curable resin contained in the hard coat layer 3. Thereby, the photocatalytic film 10 can acquire excellent scratch resistance. The hydroxyl group of the ultraviolet-curable resin is preferably a primary hydroxyl group.

Examples of the monomers/oligomers having a primary hydroxyl group include 4-hydroxybutyl acrylate, 2-hydroxyethyl acrylate, 2-hydroxyethyl methacrylate, 4-hydroxybutyl methacrylate, diethylene glycol methacrylate, polyethylene glycol methacrylate, and the like.

The hard coat layer 3 may contain an ultraviolet-curable resin and inorganic particles. In this case, the hard coat layer 3 may have a structure in which inorganic particles are dispersed in the ultraviolet-curable resin as a matrix. Thereby, the hardness of the hard coat layer can increase to improve the scratch resistance of the photocatalytic film 10. A weight proportion of the inorganic particles in the hard coat layer 3 is 5 wt % or higher and 50 wt % or lower, preferably 10 wt % or higher and 45 wt % or lower, more preferably 15 wt % or higher and 40 wt % or lower. This weight proportion makes it possible to increase the hardness of the hard coat layer and increase transparency of the photocatalytic film.

The inorganic particles contained in the hard coat layer 3 are oxide particles, silica particles, copper compound particles, silver particles, silver compound particles, or the like. The inorganic particles may have an oxide layer on their surfaces.

Preferably, the inorganic particles are oxide particles such as silica particles, or have an oxide layer on their surfaces. Thereby, the adhesiveness between the hard coat layer 3 and the photocatalytic coat layer 4 can be improved. Specifically, the binder and the inorganic particles can be chemically bonded by a dehydration condensation reaction between a hydroxyl group generated by hydrolysis of a residual alkoxy group (—OR) of the hydrolyzed condensate (binder) contained in the photocatalytic coat layer 4 and a hydroxyl group on the surfaces of the inorganic particles on the surface of the hard coat layer 3.

When the inorganic particles are silica particles, the inorganic particles have an average particle diameter D50 of e.g. 5 nm or larger and 80 nm or smaller, preferably 10 nm or larger and 45 nm or smaller. This average particle diameter allows the photocatalytic film 10 to acquire excellent transparency.

The inorganic particles contained in the hard coat layer 3 may be composed of a copper compound, silver, or a silver compound. Thereby, the antiviral activity of the photocatalytic film 10 can be improved.

The hard coat layer 3 may also contain multiple types of inorganic particles. For example, the hard coat layer 3 can contain oxide particles and silver particles.

For example, the hard coat layer 3 can be formed by coating the base film 2 with an ultraviolet (UV)-curable paint and irradiating this coating layer with ultraviolet ray to harden the coating layer. The coating method is not particularly limited, but the UV-curable paint can be applied on one side of the base film e.g. using a film applicator.

For example, the UV-curable paint can contain oligomers, a photopolymerization initiator, and a solvent. The UV-curable paint may also contain monomers. The UV-curable paint may also contain inorganic particles. The UV-curable paint may also be a solvent-free paint.

Examples of the oligomers include polyester acrylates, urethane acrylates, epoxy acrylates, and the like. Examples of the monomers include multifunctional acrylate monomers, monofunctional acrylate monomers, and the like. Examples of the photopolymerization initiator include an acylphosphine oxide-based polymerization initiator, a benzophenone-based polymerization initiator, an acetophenone-based polymerization initiator, a benzoin ether-based polymerization initiator, a thioxanthone-based polymerization initiator, and the like. Examples of the solvents include methylethylketone and the like.

The photocatalytic coat layer 4 is placed on the hard coat layer 3 and contains photocatalytic particles and a binder. The photocatalytic particles exhibit a photocatalytic activity by receiving light and is specifically exemplified by tungsten oxide particles ($WO_3$ particles). Since tungsten oxide has a wide light absorption band and exhibits a photocatalytic activity by receiving a visible light, tungsten oxide can exhibit the photocatalytic activity to oxidize organic matters such as viruses by receiving light from a display such as a liquid crystal display, an organic EL display, a plasma display, and a micro light-emitting diode (LED) display.

The photocatalytic coat layer 4 can be formed by coating the hard coat layer 3 with a photocatalytic coating agent and drying this coating layer. The coating method for the photocatalytic coating agent is not particularly limited, but can be e.g. a coating method using a film applicator, a spray coating method, a spin coating method, a dip coating method, or the like.

The photocatalytic coat layer 4 has a thickness of 0.1 μm or larger and 5.0 μm or smaller, preferably 0.3 μm or larger and 3.0 μm or smaller, more preferably 0.5 μm or larger and 1.0 μm or smaller. This thickness makes it possible to increase the photocatalytic activity of the photocatalytic coat layer 4 and to suppress increase in the haze of the photocatalytic film 10.

The tungsten oxide particles ($WO_3$ particles) as the photocatalytic particles may have a composition deviating from the stoichiometric composition as long as they have a photocatalytic activity. The tungsten oxide particles may also contain impurity atoms or additive atoms unless the photocatalytic activity is lost. The photocatalytic particles may also have, on their surfaces, a cocatalyst that reduces an energy gap between the photocatalytic particles to increase a responsiveness in the visible light region. For example, the cocatalyst contains platinum group metals such as Pt, Pd, Rh, Ru, Os, and Ir.

The tungsten oxide particles have an average particle diameter (median diameter D50, particle diameter at a cumulative distribution of 50 vol %, or Brunauer-Emmett-Teller (BET) particle diameter) of 10 nm or larger and 5000 nm or smaller, preferably 30 nm or larger and 1000 nm or smaller, more preferably 50 nm or larger and 200 nm or smaller. This average particle diameter makes it possible to suppress increase in the haze of the photocatalytic film. The average particle diameter of the photocatalytic particles can be measured by a BET specific surface meter, a laser diffraction type particle size distribution meter, a dynamic light-scattering type particle size distribution meter, or the like.

A proportion of the tungsten oxide particles in the photocatalytic coat layer 4 is 25 wt % or higher and 55 wt % or lower, preferably 35 wt % or higher and 52 wt % or lower.

The binder contained in the photocatalytic coat layer 4 is composed of a tetraalkoxysilane hydrolyzed condensate. Preferably, the hydrolyzed condensate is a long-chain siloxane compound. Preferably, the binder is composed of a siloxane compound having a linear portion. The binder may have a polymer structure in which a viscosity of a dispersion liquid of 10 wt % of the hydrolyzed condensate dispersed in ethanol at 20° C. is 2.0 cps or higher and 4.0 cps or lower. This structure makes it possible to prevent the binder from decomposing by the photocatalytic activity, and to suppress increase in the viscosity of the photocatalytic coating agent to be used to form the photocatalytic coat layer 4. Consequently, it is possible to decrease the surface roughness of the formed photocatalytic coat layer 4, and to suppress increase in the haze of the photocatalytic film 10 including this photocatalytic coat layer 4.

The long-chain siloxane compound may be a compound having a long-chain portion with continuous siloxane bonds (e.g. a compound having a chain with several tens or more of continuous siloxane bonds), a linear siloxane compound, a branched siloxane compound, or an irregular-chain siloxane compound.

The hydroxyl group of the long-chain siloxane compound may be dehydration-condensed with the hydroxyl group on the surfaces of the photocatalytic particles. In this case, the long-chain siloxane compound is chemically bonded to the surfaces of the photocatalytic particles. When the hard coat layer 3 has a hydroxyl group, the hydroxyl group in the long-chain siloxane compound may dehydration-condensed with the hydroxyl group in the hard coat layer 3. In this case, the long-chain siloxane compound is chemically bonded to the hard coat layer 3.

Preferably, a liquid medium (solvent or dispersant) contained in the photocatalytic coating agent used for forming the photocatalytic coat layer 4 contains water. The liquid medium may be a mixture of water and an alcohol (e.g. ethanol). The liquid medium may be a mixture of liquids (e.g. water and alcohol) contained in the mixture containing the binder, and liquids (e.g. water and alcohol) to be added for preparing the photocatalytic coating agent. For example, a proportion of water in the photocatalytic coating agent is 20 wt % or higher and 60 wt % or lower, preferably 35 wt % or higher and 55 wt % or lower.

For example, a proportion of the alcohol in the photocatalytic coating agent is 20 wt % or higher and 70 wt % or lower, preferably 30 wt % or higher and 70 wt % or lower, more preferably 40 wt % or higher and 60 wt % or lower. This proportion makes it possible to improve the stability of the photocatalytic coating agent.

In the photocatalytic coating agent, the photocatalytic particles (photocatalytic powder) are dispersed in a liquid medium. A proportion of the tungsten oxide particles in the photocatalytic coating agent is preferably 0.1 wt % or higher and 6.0 wt % or lower, more preferably 1 wt % or higher and 5.0 wt % or lower.

Tetraalkoxysilane $Si(OR)_4$ has a chemical structure in which four alkoxy groups (—OR) are bonded to silicon atom (Si). When $Si(OR)_4$ is mixed with water, $Si(OR)_4$ is hydrolyzed. The silicon compound produced by the hydrolysis three-dimensionally grows through a dehydration condensation reaction to form a three-dimensional network $SiO_2$ (glass). Note that the dehydration condensation reaction proceeds simultaneously with the hydrolysis reaction. To change substantially all of $Si(OR)_4$ into $SiO_2$, 2 mol of water ($H_2O$) is required based on 1 mol of $Si(OR)_4$. When the hydrolysis/condensation reaction proceeds in the presence of 2 mol or more of water based on 1 mol of $Si(OR)_4$, a three-dimensional network $SiO_2$ (sol or gel) is formed.

Figures 3A, 3B:
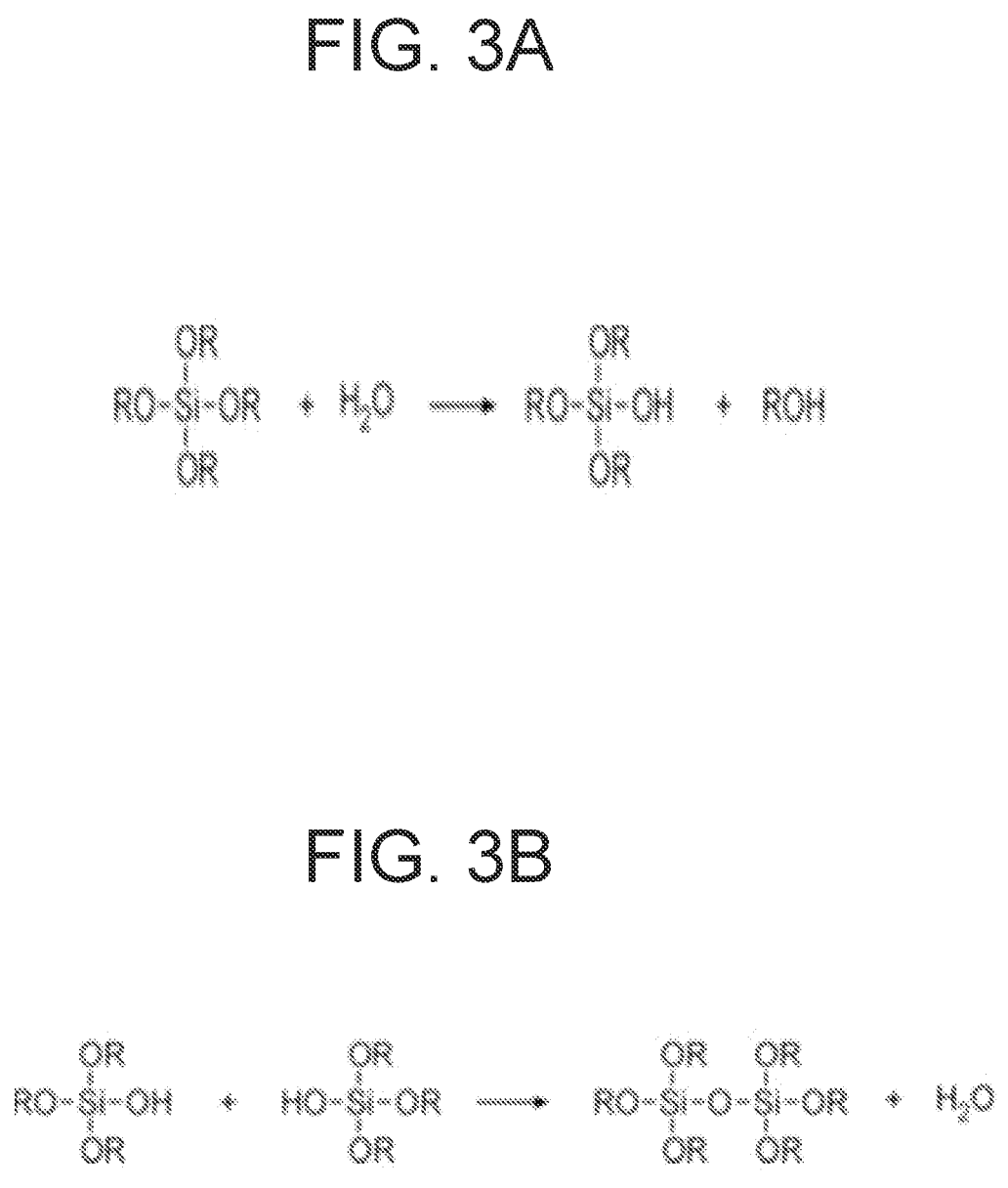

When the hydrolysis/condensation reaction proceeds with water ($H_2O$) in a less amount relative to $Si(OR)_4$ (first step), the hydrolysis reaction proceeds on some of the four alkoxy groups in tetraalkoxysilane, and the alkoxy groups are substituted by hydroxyl groups, as presented in the chemical reaction formula of FIG. 3A. Then, the hydroxyl groups produced by the hydrolysis reaction are dehydration-condensed to polymerize the silane compound, so that a siloxane compound and water ($H_2O$) are produced, as presented in the chemical reaction formula in FIG. 3B. This water is used for the hydrolysis reaction as presented in the chemical reaction equation of FIG. 3A. In this way, by consecutively repeating the hydrolysis reaction and the dehydration condensation reaction, the siloxane compound grows into a long thin shape. The siloxane compound continues to grow until water runs out (first hydrolysis/condensation reaction). A time taken for advancing the first hydrolysis/condensation reaction (time during which the temperature is maintained and the stirring is continued) can be e.g. 2 hours or longer and 15 hours or shorter.

In the first hydrolysis/condensation reaction (first step), $Si(OR)_4$, an alcohol (e.g. ethanol), and water can be mixed to advance the hydrolysis reaction and the dehydration condensation reaction. Thereby, separation between $Si(OR)_4$ and water can be prevented, and the hydrolysis reaction and the dehydration condensation reaction can be evenly advanced. In the first hydrolysis/condensation reaction, $Si(OR)_4$, an alcohol, water, and an acid catalyst (e.g. hydrochloric acid) can be mixed to advance the hydrolysis reaction and the dehydration condensation reaction. Thereby, the first hydrolysis/condensation reaction can be advanced at an appropriate reaction rate.

In the first hydrolysis/condensation reaction (first step), the hydrolysis reaction and the dehydration condensation reaction can be advanced at a freezing temperature or higher and 20° C. or lower. Thereby, increase in branches of the siloxane compound can be suppressed, so that increase in the viscosity of the mixture can be suppressed.

A mixing ratio of $Si(OR)_4$ and water in the first hydrolysis/condensation reaction (first step) can be adjusted such that an amount of water to 1 mol of $Si(OR)_4$ is 0.5 mol or more and 1 mol or less, preferably 0.6 mol or more and 0.9 mol or less, more preferably 0.7 mol or more and 0.8 mol or less. This mixing ratio makes it possible to grow the siloxane compound into a long thin shape to form a long-chain siloxane compound. Furthermore, the siloxane compound can be prevented from growing three-dimensionally, and increase in the viscosity of the mixture can be suppressed.

After the first hydrolysis/condensation reaction is advanced until water substantially runs out, water and an acid catalyst can be added to the mixture after this reaction to further advance the hydrolysis reaction and the dehydration condensation reaction (second step, second hydrolysis/condensation reaction). The binder ($Si(OR)_4$ hydrolyzed condensate) is synthesized by completing the second hydrolysis/condensation reaction. This binder is a long-chain siloxane compound.

Also in the second hydrolysis/condensation reaction, the siloxane compound grows into a long thin shape because the hydrolysis/condensation reaction proceeds with water ($H_2O$) in a less amount relative to the alkoxy group (—OR) of the siloxane compound. The siloxane compound continues to grow until water runs out. The time taken for advancing the second hydrolysis/condensation reaction (time during which the temperature is maintained and the stirring is continued) can be e.g. 2 hours or longer and 30 hours or shorter.

An amount of water added in the second hydrolysis/condensation reaction can be 0.5 mol or more and 1.4 mol or less based on 1 mol of $Si(OR)_4$ as the starting material. This amount makes it possible to grow the siloxane compound into a long thin shape, so that the $Si(OR)_4$ hydrolyzed condensate (binder) has a long-chain shape.

An amount of the acid catalyst (e.g. hydrochloric acid) added to the mixture in the second hydrolysis/condensation reaction (second step) is preferably more than the amount of the acid catalyst added in the first hydrolysis/condensation reaction (first step). This amount makes it possible to increase the molecular weight of the siloxane compound by the second hydrolysis/condensation reaction, to improve the scratch resistance (printing durability) of the photocatalytic coat layer 4.

A total amount of water added in the first hydrolysis/condensation reaction (first step) and water added in the second hydrolysis/condensation reaction (second step) can be 1.6 mol or more and 1.9 mol or less based on 1 mol of $Si(OR)_4$. This total amount allows the $Si(OR)_4$ hydrolyzed condensate (binder) after the reaction to have a residual alkoxy group (—OR). When the photocatalytic coating agent is prepared by mixing the binder, the photocatalytic particles, and water, the hydroxyl group produced by the hydrolysis of the residual alkoxy group in the photocatalytic coating agent is dehydration-condensed with the hydroxyl group on the surfaces of the photocatalytic particles, so that the binder and the photocatalytic particles can be chemically bonded. Thereby, the photocatalytic particles can be firmly fixed by the binder.

The photocatalytic coating agent can be prepared by mixing the photocatalytic particles with the binder-containing mixture obtained through the first and second hydrolysis/condensation reactions (first and second steps).

A content of the binder ($Si(OR)_4$ hydrolyzed condensate) in the photocatalytic coating agent can be 3 wt % or more and 5 wt % or less in terms of $SiO_2$-equivalent amount (amount of $SiO_2$ contained in the photocatalytic coating agent when all $Si(OR)_4$ are changed into $SiO_2$ by the hydrolysis/condensation reaction).

A proportion of the binder ($Si(OR)_4$ hydrolyzed condensate) in the photocatalytic coat layer 4 formed by drying the coating layer of the photocatalytic coating agent is 30 wt % or higher and 55 wt % or lower, preferably 35 wt % or higher and 50 wt % or lower in terms of $SiO_2$-equivalent amount (amount of $SiO_2$ contained in the photocatalytic coating agent when all $Si(OR)_4$ are changed into $SiO_2$ by the hydrolysis/condensation reaction).

The photocatalytic coating agent and the photocatalytic coat layer 4 may contain a fluororesin. Thereby, the surface smoothness (flowability) of the photocatalytic coat layer 4 can be improved, and the haze can be reduced even when a proportion of the photocatalytic particles in the photocatalytic coat layer 4 is high and an antiviral activity value is high. Furthermore, the scratch resistance (printing durability) of the photocatalytic coat layer 4 can be improved. Examples of the fluororesin include polytetrafluoroethylene (PTFE), fluorinated-ethylene-propylene (FEP), p-fluorophenylalanine (PFA), polyvinylidene fluoride (PVDF), ethylene tetrafluoro ethylene (ETFE), polymonochlorotrifluoroethylene (PCTFE), ethylene/chlorotrifluoroethylene (ECTFE), and the like. A proportion of the fluororesin in the photocatalytic coating agent is 0.5 wt % or higher and 5 wt % or lower, preferably 1 wt % or higher and 4.5 wt % or lower. A proportion of the fluororesin in the photocatalytic coat layer 4 is e.g. 10 wt % or higher and 40 wt % or lower, preferably 15 wt % or higher and 35 wt % or lower, more preferably 20 wt % or higher and 30 wt % or lower. As the fluororesin, for example, ZEFFLE S-520, SE-300A, SE-405, SE-600, and SE-700 manufactured by Daikin Industries, Ltd., LUMIFLON FE4300, FE4400, and FE4500 manufactured by AGC Inc., and SIFCLEAR F101, F102, and F104 manufactured by Emulsion Technology Co., Ltd. can be used.

The photocatalytic coating agent and the photocatalytic coat layer 4 may contain inorganic fine particles. The inorganic fine particles are zirconia particles, copper compound particles, silica particles, silver particles, silver compound particles, or the like. This makes it possible to improve the stability of the photocatalytic coating agent. Although the reason for this is not clear, this is thought to be because the zeta potential of these fine particles are reverse to that of the tungsten oxide particles. A proportion of the inorganic fine particles in the photocatalytic coating agent is e.g. 0.01 wt % or higher and 0.1 wt % or lower. A proportion of the inorganic fine particles in the photocatalytic coat layer 4 is e.g. 0.1 wt % or higher and 1.0 wt % or lower.

The photocatalytic coating agent and the photocatalytic coat layer 4 may contain a cyclodextrin clathrate compound. This makes it possible to improve the stability of the photocatalytic coating agent. Although the reason for this is not clear, this is thought to be because the clathrate compound takes up miscellaneous ions in the photocatalytic coating liquid. A proportion of the cyclodextrin clathrate compound in the photocatalytic coating agent is e.g. 0.01 wt % or higher and 0.1 wt % or lower. A proportion of the cyclodextrin clathrate compound in the photocatalytic coat layer 4 is e.g. 0.1 wt % or higher and 1.0 wt % or lower.

Preparation of Tungsten Oxide Dispersion Liquid

A raw material powder (manufactured by KISHIDA CHEMICAL CO., LTD.) of tungsten oxide ($WO_3$) and ion-exchange water were subjected to wet milling (peripheral speed: 10 m/sec, processing time: 360 min) using a bead mill to obtain a tungsten oxide dispersion liquid ($WO_3$: 20 wt %). The tungsten oxide particles had a primary particle diameter of about nm. To obtain 0.02 wt % of Pt—$WO_3$, hexachloroplatinum (VI) hexahydrate (manufactured by KISHIDA CHEMICAL CO., LTD.) was added and dissolved into this tungsten oxide dispersion liquid so that Pt as a cocatalyst was supported on the surfaces of the tungsten oxide particles.

Synthesis of TEOS Hydrolyzed Condensate

Tetraethoxysilane (TEOS) (ethyl silicate 28, manufactured by COLCOAT CO., LTD.) was hydrolyzed and condensed to synthesize hydrolyzed condensates PS1 and PS2.

In synthesis of PS1, first, the materials for the first hydrolysis/condensation reaction presented in Table 1 were put into a 500 ml flask equipped with a stirring blade, and hydrolyzed and condensed for 10 hours while stirring at 100 RPM and cooling such that a liquid temperature was 10° C. Next, the materials for the second hydrolysis/condensation reaction presented in Table 1 were added to this flask, and hydrolyzed and condensed for 10 hours while stirring at 100 RPM and cooling such that a liquid temperature was 10° C. In the synthesis of the hydrolyzed condensate PS2, the hydrolysis/condensation reaction was carried out for 20 hours without adding the materials for the second hydrolysis/condensation reaction. Except that the materials for the second hydrolysis/condensation reaction were not added, PS2 was synthesized in the same way as for the hydrolyzed condensate PS1.

Table 1 also presents proportions of the compositions in the hydrolyzed condensates. A proportion of TEOS is presented in terms of $SiO_2$-equivalent amount (amount of $SiO_2$ after all TEOS are changed into $SiO_2$ by the advanced hydrolysis reaction and condensation reaction).

TABLE 1

| | First hydrolysis/condensation reaction | | | | | Second hydrolysis/condensation reaction | | |
|---|---|---|---|---|---|---|---|---|
| Hydrolyzed condensate | TEOS (parts by weight) | Ethanol (parts by weight) | Water (parts by weight) | 1N hydrochloric acid (parts by weight) | Molar ratio of water to TEOS | Ethanol (parts by weight) | Water (parts by weight) | 1N hydrochloric acid (parts by weight) |
| PS1 | 100 | 100 | 6.5 | 0.1 | 0.75 | 65 | 8.5 | 0.2 |
| PS2 | 100 | 165 | 15 | 0.3 | 1.73 | — | — | — |

| | | Proportion | | | | | |
|---|---|---|---|---|---|---|---|
| Hydrolyzed condensate | Total (parts by weight) | TEOS amount in terms of $SiO_2$—equivalent | Ethanol | Water | 1N hydrochloric acid | Total | Viscosity (cps) |
| PS1 | 280.3 | 10.0 wt % | 84.6 wt % | 5.4 wt % | 0.1 wt % | 100 wt % | 2.5 |
| PS2 | 280.3 | 10.0 wt % | 84.6 wt % | 5.4 wt % | 0.1 wt % | 100 wt % | 5.6 |

Viscosity Measurement 1

The viscosities of the hydrolyzed condensates PS1 and PS2 were measured using a viscometer (VISCOMATE MODEL VM-10A, manufactured by SEKONIC CORPORATION). Measurement results are presented in Table 1. The viscosity of the hydrolyzed condensate PS1 was 2.5 cps, and meanwhile the viscosity of the hydrolyzed condensate PS2 was 5.6 cps.

In the first hydrolysis/condensation reaction, a molar ratio of water to TEOS in the hydrolyzed condensate PS2 is as high as 1.73, and therefore the siloxane compound is considered to three-dimensionally grow. It is considered that, for this reason, the viscosity of the hydrolyzed condensate PS2 increased.

In the first hydrolysis/condensation reaction, a molar ratio of water to TEOS in the hydrolyzed condensate PS1 is as low as 0.75, and therefore the siloxane compound is considered to grow into a long thin shape. It is considered that, for this reason, the viscosity of the hydrolyzed condensate PS1 decreased.

Preparation of Photocatalytic Coating Agent

Photocatalytic coating agents LC1, LC2, and LC3 were prepared. Specifically, materials listed in Table 2 among a tungsten oxide dispersion liquid ($WO_3$: 20 wt %), the hydrolyzed condensate PS1 of TEOS, a lubricant (ZEFFLE S-520, manufactured by Daikin Industries, Ltd., fluororesin: 50 wt %), distilled water, ethanol (manufactured by KISHIDA CHEMICAL CO., LTD.) are mixed/stirred in blending amounts presented in Table 2 to prepare the coating agents LC1, LC2, and LC3. Also, Table 2 presents concentrations of solid contents in the coating agents, proportions in the coating agents, and proportions of the solid contents in the coating agents (in parentheses). The proportions of the hydrolyzed condensates in Table 2 are presented in terms of $SiO_2$-equivalent amount (amount of $SiO_2$ after all TEOS are changed into $SiO_2$ by the advanced hydrolysis reaction and condensation reaction). The photocatalytic coating agent LC3 contains no TEOS hydrolyzed condensate.

(viscosity stability) of the photocatalytic coating agents was evaluated. Measurement results and evaluation results are presented in Table 2. In Table 2, the coating agent with lower than 3 cps of viscosity change between before and after leaving the coating agent was rated as Good. No coating agent had 3 cps or higher of viscosity change.

Preparation of UV-Curable Paint

UV-curable paints HC1 to HC12 were prepared. Specifically, materials listed in Table 3 among methylethylketone (MEK, manufactured by KISHIDA CHEMICAL CO., LTD.) as a solvent, monomers/oligomers, a polymerization initiator, and inorganic fine particles are mixed/stirred in blending amounts presented in Table 3 to prepare the UV-curable paints HC1 to HC12. Also, Table 3 presents a total proportion of components excluding the solvent, and proportions of components excluding the solvent.

As the monomers/oligomers, trimethylolpropane triacrylate (Miramer M300, manufactured by Miwon Specialty Chemical Co., Ltd.), dipentaerythritol pentaacrylate hexamethylene diisocyanate urethane prepolymer (UA-510H, manufactured by KYOEISHA CHEMICAL CO., LTD.), polyethylene glycol (200) diacrylate (Miramer M282, manufactured by Miwon Specialty Chemical Co., Ltd.), or 4-hydroxybutyl acrylate (4 HBA, manufactured by OSAKA ORGANIC CHEMICAL INDUSTRY LTD.) was used. Note that 4-hydroxybutyl acrylate has hydroxyl groups.

As the polymerization initiator, 1-hydroxycyclohexyl-phenyl ketone (Omnirad 184, manufactured by IGM Resins B.V.) or bis(2,4,6-trimethylbenzoyl)-phenyl phosphine oxide (Omnirad 819, manufactured by IGM Resins B.V.) was used.

TABLE 2

| Coating agent | Blending amount: $WO_3$ dispersion liquid (parts by weight) | Hydrolyzed condensate | Lubricant S-520 (parts by weight) | Water (parts by weight) | Ethanol (parts by weight) | Total (parts by weight) | Concentration of solid content |
|---|---|---|---|---|---|---|---|
| LC1 | 50 | PS1, 100 parts by weight | — | 60 | 40 | 250 | 8.0 wt % |
| LC2 | 50 | PS1, 100 parts by weight | 12.5 | 60 | 40 | 262.5 | 10.0 wt % |
| LC3 | 50 | 0 parts by weight | 20 | 60 | 120 | 250 | 8.0 wt % |

| Coating agent | Proportion: $WO_3$ | Hydrolyzed condensate (in terms of $SiO_2$) | Fluororesin (Lubricant) | Water | Ethanol | Total | Coating liquid stability |
|---|---|---|---|---|---|---|---|
| LC1 | 4.0 wt % (50.0 wt %) | 4.0 wt % (50.0 wt %) | 0.0 wt % (0 wt %) | 42.2 wt % (0 wt %) | 49.8 wt % (0 wt %) | 100 wt % (100 wt %) | Good |
| LC2 | 3.8 wt % (38.1 wt %) | 3.8 wt % (38.1 wt %) | 2.4 wt % (23.8 wt %) | 42.5 wt % (0 wt %) | 47.5 wt % (0 wt %) | 100 wt % (100 wt %) | Good |
| LC3 | 4.0 wt % (50.0 wt %) | 0 wt % (0 wt %) | 4 wt % (50 wt %) | 44.0 wt % (0 wt %) | 48.0 wt % (0 wt %) | 100 wt % (100 wt %) | Good |

Viscosity Measurement 2

Immediately after preparation of the photocatalytic coating agents LC1, LC2, and LC3, their viscosities were measured using a viscometer (VISCOMATE MODEL VM-10A, manufactured by SEKONIC CORPORATION). The prepared photocatalytic coating agents were left at 45° C. for 7 days, and then the viscosities of the photocatalytic coating agents LC1, LC2, and LC3 were measured again. Based on their measurements, the coating liquid stability As the inorganic particles, silica sol MEK solvent (MEK-ST-40, manufactured by Nissan Chemical Corporation, particle diameter: 12 nm), silica sol MEK solvent (MEK-ST-L, manufactured by Nissan Chemical Corporation, particle diameter: 45 nm), silica sol MEK solvent (MEK-ST-ZL, manufactured by Nissan Chemical Corporation, particle size: 80 nm), copper(I) iodide (manufactured by Tokyo Chemical Industry Co., Ltd.), or silver-based fine particle water dispersion (NOVARON AGT330F, manufactured by Toagosei Company, Limited) was used. For NOVARON AGT330F, water in the solvent was replaced with methylethylketone, which was used at 40% concentration.

TABLE 3

| UV-curable paint | Compounding amount: Monomer/oligomer: M300 (parts by weight) | UA-510H (parts by weight) | M282 (parts by weight) | 4HBA (parts by weight) | Initiator: 184 (parts by weight) | 819 (parts by weight) | Inorganic fine particle |
|---|---|---|---|---|---|---|---|
| HC1 | 50 | 50 | 30 | — | 2 | — | — |
| HC2 | 50 | 50 | 30 | — | 2 | — | ST-40, 120 parts by weight |
| HC3 | 50 | 50 | 30 | — | 2 | — | ST-40, 20 parts by weight |
| HC4 | 50 | 50 | 30 | — | 2 | — | ST-40, 300 parts by weight |
| HC5 | 50 | 50 | 30 | — | 2 | — | ST-L, 159 parts by weight |
| HC6 | 50 | 50 | 30 | — | 2 | — | ST-ZL, 159 parts by weight |
| HC7 | 50 | 50 | 30 | — | 2 | — | CuI, 48 parts by weight |
| HC8 | 50 | 50 | 30 | — | 2 | — | Ag, 120 pats by weight |
| HC9 | 50 | 50 | 15 | 15 | 2 | — | — |
| HC10 | 50 | 50 | 30 | — | 2 | 2 | — |
| HC11 | 50 | 50 | 30 | — | 2 | — | — |
| HC12 | 50 | 50 | 30 | — | 2 | — | — |

| UV-curable paint | Compounding amount: MEK (parts by weight) | Total (parts by weight) | Total proportion of components excluding solvent | Proportion (excluding solvent): Monomer | Initiator | Inorganic fine particle | Total |
|---|---|---|---|---|---|---|---|
| HC1 | 198 | 330 | 40.0 wt % | 98.5 wt % | 1.5 wt % | 0.0 wt % | 100 wt % |
| HC2 | 198 | 450 | 40.0 wt % | 72.2 wt % | 1.1 wt % | 26.7 wt % | 100 wt % |
| HC3 | 198 | 350 | 40.0 wt % | 92.9 wt % | 1.4 wt % | 5.7 wt % | 100 wt % |
| HC4 | 198 | 630 | 40.0 wt % | 51.6 wt % | 0.8 wt % | 47.6 wt % | 100 wt % |
| HC5 | 158 | 449 | 40.0 wt % | 72.3 wt % | 1.1 wt % | 26.5 wt % | 100 wt % |
| HC6 | 158 | 449 | 40.0 wt % | 72.3 wt % | 1.1 wt % | 26.5 wt % | 100 wt % |
| HC7 | 270 | 450 | 40.0 wt % | 72.2 wt % | 1.1 wt % | 26.7 wt % | 100 wt % |
| HC8 | 198 | 450 | 40.0 wt % | 72.2 wt % | 1.1 wt % | 26.7 wt % | 100 wt % |
| HC9 | 198 | 330 | 40.0 wt % | 98.5 wt % | 1.5 wt % | 0.0 wt % | 100 wt % |
| HC10 | 198 | 332 | 40.4 wt % | 97.0 wt % | 3.0 wt % | 0.0 wt % | 100 wt % |
| HC11 | 528 | 660 | 20.0 wt % | 98.5 wt % | 1.5 wt % | 0.0 wt % | 100 wt % |
| HC12 | 198 | 330 | 40.0 wt % | 98.5 wt % | 1.5 wt % | 0.0 wt % | 100 wt % |

Preparation of Photocatalytic Film

One side of a 100 μm-thick PET film (COSMOSHINE 100A4360, manufactured by TOYOBO CO., LTD.) was coated with a prepared UV-curable paint using a film applicator (manufactured by OSG SYSTEM PRODUCTS Co., Ltd.), and the coating layer was dried at 80° C. for 1 minute. The dried coating layer was irradiated with ultraviolet light (250 mJ/cm$^2$) to advance the polymerization reaction, so that a hard coat layer with the hardened coating layer was formed. The thickness of the hard coat layer was adjusted to 1.5 μm, 3.5 μm, or 6.5 μm by using film applicators having different gap intervals.

Subsequently, the hard coat layer was coated with the prepared photocatalytic coating agent using a film applicator, and the coating layer was dried at 80° C. for 10 seconds to form the photocatalytic coat layer. Then, the PET film, the hard coat layer, and the photocatalytic coat layer were left at room temperature for one week. In this way, the photocatalytic films (Examples 1 to 13, Comparative Example 2) composed of the PET film, the hard coat layer, and the photocatalytic coat layer were prepared. The thickness of the photocatalytic coat layer was adjusted to 0.15 μm, 0.7 μm, or 3.0 μm by using film applicators having different gap intervals. Table 4 presents compositions of the prepared photocatalytic films, UV-curable paints used for the preparation, and photocatalytic coating agents used for the preparation. The photocatalytic coat layer of the photocatalytic film in Comparative Example 2 contains no TEOS hydrolyzed condensate.

Table 4 also presents a PET film of Reference Example having no hard coat layer and no photocatalytic coat layer, and a photocatalytic film of Comparative Example 1 having no hard coat layer.

In the photocatalytic film of Comparative Example 1, one side of the PET film was coated with the photocatalytic coating agent, and the coating layer was dried at 80° C. for 10 seconds to form the photocatalytic coat layer. Then, the PET film and the photocatalytic coat layer were left at room temperature for one week. In this way, the photocatalytic films of Comparative Examples were prepared.

TABLE 4

| Photocatalytic film | Film composition | | | | | Haze | Pencil hardness | Printing durability | Adhesiveness | Antiviral activity | | Total evaluation |
|---|---|---|---|---|---|---|---|---|---|---|---|---|
| | | Hard coat layer | | Photocatalytic coat layer | | | | | | | | |
| | Base film | UV-curable paint | Film thickness | Coating agent | Film thickness | | | | | Antiviral activity value | Evaluation | |
| Reference Example | PET film | — | — | — | — | Excellent | B | Poor | — | 0.0 | Poor | Poor |
| Comparative Example 1 | PET film | — | — | LC1 | 0.70 μm | Good | HB | Poor | Good | 2.5 | Fair | Poor |
| Example 1 | PET film | HC1 | 3.5 μm | LC1 | 0.70 μm | Good | 2H | Good | | 2.6 | Fair | Good |
| Example 2 | PET film | HC2 | 3.5 μm | LC1 | 0.70 μm | Good | 3H | Excellent | Excellent | 2.4 | | Good |
| Example 3 | PET film | HC3 | 3.5 μm | LC1 | 0.70 μm | Good | 2H | Good | Good | 2.7 | Fair | Good |
| Example 4 | PET film | HC4 | 3.5 μm | LC1 | 0.70 μm | Far | 3H | Excellent | Excellent | 2.3 | Fair | Good |
| Example 5 | PET film | HC5 | 3.5 μm | LC1 | 0.70 μm | Good | 3H | Excellent | Excellent | 2.3 | Fair | Good |
| Example 6 | PET film | HC6 | 3.5 μm | LC1 | 0.70 μm | Fair | 3H | Excellent | Excellent | 2.4 | Fair | Good |
| Example 7 | PET film | HC7 | 3.5 μm | LC1 | 0.70 μm | Fair | 3H | Excellent | Fair | 3.5 | Good | Good |
| Example 8 | PET film | HC8 | 3.5 μm | LC1 | 0.70 μm | Fair | 3H | Excellent | Fair | 3.2 | Good | Good |
| Example 9 | PET film | HC9 | 3.5 μm | LC1 | 0.70 μm | Good | 3H | Excellent | Excellent | 2.4 | Fair | Good |
| Example 10 | PET film | HC10 | 3.5 μm | LC1 | 0.70 μm | Good | 3H | Excellent | Good | 3.1 | Good | Good |
| Example 11 | PET film | HC11 | 1.5 μm | LC1 | 0.70 μm | Good | 2H | Good | Fair | 2.4 | Fair | Good |
| Example 12 | PET film | HC12 | 6.5 μm | LC1 | 0.70 μm | Fair | 3H | Excellent | Fair | 2.3 | Fair | Good |
| Example 13 | PET film | HC1 | 3.5 μm | LC2 | 0.70 μm | Good | 3H | Excellent | Fair | 2.5 | Fair | Good |
| Comparative Example 2 | PET film | HC1 | 3.5 μm | LC3 | 0.70 μm | Good | HB | Poor | Poor | 2.3 | Fair | Poor |

Haze Measurement

Hazes (cloudiness) Z (%) of the photocatalytic films of Examples 1 to 13 and Comparative Examples 1 and 2, and the PET film of Reference Example were measured using a haze meter "NDH7000" manufactured by NIPPON DENSHOKU INDUSTRIES Co., LTD. The haze is a value calculated from a ratio of diffused transmitted lights to the total transmitted lights and is affected by roughness of the film surface. The higher the haze is, the cloudier the film is, and the lower the transparency is.

Measurement results are presented in Table 4. In Table 4, films rated as "Excellent" had haze Z of 2 or lower, films rated as "Good" had haze Z of higher than 2 and 3 or lower, and films rated as "Fair" had haze Z of higher than 3 and lower than 4. No film had a haze of 4 or higher. Here, the cases rated as "Excellent", "Good", or "Fair" were determined to be at acceptable levels (superior in transparency of the film).

Hardness Measurement of Photocatalytic Film

The hardnesses (pencil hardness) of the photocatalytic films were measured by pressing a pencil with a known hardness against the photocatalytic coat layer of the photocatalytic film in Examples 1 to 13 and Comparative Examples 1 and 2 (load: 750 g) using a method in accordance with Japanese Industrial Standard (JIS) K 5600-5-4: 1999 (International Organization for Standardization (ISO)/Draft International Standard (DIS) 15184: 1996). In Reference Example, the hardness of a PET film was measured by pressing a pencil against the PET film. Measurement results are presented in Table 4.

The hardness of the PET film in Reference Example was equivalent to "B", and the hardnesses of the photocatalytic films in Comparative Examples 1 and 2 were equivalent to "HB". Thus, it was found that the hardness of the film was increased by forming the photocatalytic coat layer on the PET film. The hardnesses of the photocatalytic films in Examples 1 to 13 having the laminated structure of the hard coat layer and the photocatalytic coat layer on the PET film were equivalent to "2H" or "3H". Thus, it was found that the hardness of the photocatalytic film was further increased by providing the laminated structure of the hard coat layer and the photocatalytic coat layer on the PET film. Furthermore, it was also found that the hardness of the photocatalytic film was increased when the photocatalytic coat layer contains the TEOS hydrolyzed condensate.

Printing Durability Test (Scratch Resistance Test)

Using a surface property measuring machine HEIDON-14FW (manufactured by Shinto Scientific Co., Ltd.), the surface of the photocatalytic coat layer of the photocatalytic film in Examples 1 to 13 and Comparative Examples 1 and 2, or the surface of the PET film in Reference Example was rubbed with steel wool #0000 (manufactured by NIHON STEEL WOOL Co., Ltd.) at a load of 500 g (stroke width: 30 mm, speed: 100 mm/s, number of rubbings: 10 laps).

A number N of scratches on the surface was counted by visually observing the rubbed surface of the photocatalytic film in Examples 1 to 13 and Comparative Examples 1 and 2 or the PET film in Reference Example, under an illuminance of 100 lx (fluorescent light). Measurement results are presented in Table 4. In Table 4, films with the scratch number N of 0 are represented by "Excellent", films with the scratch number N of 1 or more and 3 or less are represented by "Good", films with the scratch number N of 4 or more and 10 or less are represented by "Fair", and films with the scratch number N of 11 or more are represented by "Poor".

The PET films in Reference Example and the photocatalytic films in Comparative Examples 1 and 2 were rated as "Poor" in the scratch resistance. The photocatalytic films in Examples 1 to 13 having the hard coat layer were rated as "Excellent" or "Good" in the scratch resistance. Thus, it was found that the hard coat layer could improve the scratch resistance of the photocatalytic film. Also, it was found that the photocatalytic coat layer containing the TEOS hydrolyzed condensate could improve the scratch resistance of the photocatalytic film.

Herein, cases rated as "Excellent", "Good", or "Fair" were determined to be at acceptable levels (superior in scratch resistance).

Adhesiveness

The adhesiveness between the base film (PET film) and the hard coat layer or between the hard coat layer and the photocatalytic coat layer was evaluated by the grid peel test (100 squares) in accordance with ITS-K-5600. Specifically, the photocatalytic coat layer and the hard coat layer were notched in a grid pattern (100 squares), a transparent adhesive tape was stuck on the notched photocatalytic coat layer, and then this transparent adhesive tape was peeled off. Subsequently, the peeled state of the photocatalytic coat layer on the base film was visually observed, and a number "M" of the remaining squares that had not been peeled off was counted. Measurement results are presented in Table 4. In Table 4, photocatalytic films with the remaining square number M of 100 are represented by "Excellent", photocatalytic films with the remaining square number M of 95 or more and 99 or less are represented by "Good", photocatalytic films with the remaining square number M of 80 or more and 94 or less are represented by "Fair", and photocatalytic films with the remaining square number M of 0 or more and 79 or less are represented by "Poor".

Herein, cases rated as "Excellent", "Good", or "Fair" were determined to be at acceptable levels (superior in adhesiveness).

The photocatalytic film in Comparative Example 2 was rated as "Poor" in the adhesiveness. The photocatalytic films in Examples 1 to 13 and Comparative Example 1 were rated as "Excellent", "Good", or "Fair" in the adhesiveness, indicating that these films were at acceptable levels. Thus, it was found that the photocatalytic coat layer containing the TEOS hydrolyzed condensate could improve the adhesiveness of the photocatalytic film.

Antiviral Test

Antiviral activity values of the photocatalytic films in Examples 1 to 13 and Comparative Examples 1 and 2, or the PET film in Reference Example were measured by the method in accordance with JIS R 1756: 2020.

Measurement results are presented in Table 4. In evaluation of the antiviral property in Table 4, films with the antiviral activity value of 3 or higher are represented by "Good", films with the antiviral activity value of 2 or higher and lower than 3 are represented by "Fair", and films with the antiviral activity value of lower than 2 are represented by "Poor".

Herein, cases rated as "Good" or "Fair" were determined to be at acceptable levels (superior in antiviral property).

The photocatalytic films in Examples 1 to 13 and Comparative Examples 1 and 2 were rated as "Good" or "Fair" in the antiviral property, indicating that all of these cases were at acceptable levels.

Comprehensive Evaluation

Table 4 also presents the comprehensive evaluation. In the multiple evaluation items in Table 4, films having at least one evaluation item rated as "Poor" were comprehensively evaluated as "Poor", and films having no evaluation item rated as "Poor" were comprehensively evaluated as "Good".

What is claimed is:

1. A photocatalytic film comprising:
a base film;
a hard coat layer placed on the base film; and
a photocatalytic coat layer placed on the hard coat layer, wherein:
the hard coat layer contains an ultraviolet-curable resin,
the photocatalytic coat layer contains photocatalytic particles and a binder,
the photocatalytic particles are tungsten oxide particles,
the binder is composed of a tetraalkoxysilane hydrolyzed condensate,
the tetraalkoxysilane hydrolyzed condensate is a siloxane compound having a linear portion, and
the binder has a polymer structure in which a viscosity of a dispersion liquid, in which 10 wt % being the tetraalkoxysilane hydrolyzed condensate dispersed in ethanol at 20° C., is 2.0 cps or higher and 4.0 cps or lower.

2. The photocatalytic film according to claim 1, wherein
the hard coat layer further contains inorganic particles, and
a weight proportion of the inorganic particles in the hard coat layer is 5 wt % or higher and 50 wt % or lower.

3. The photocatalytic film according to claim 2, wherein the inorganic particles are silica particles.

4. The photocatalytic film according to claim 3, wherein the inorganic particles have an average particle diameter D50 of 5 nm or larger and 80 nm or smaller.

5. The photocatalytic film according to claim 2, wherein the inorganic particles are at least one of copper compound particles, silver particles, or silver compound particles.

6. The photocatalytic film according to claim 1, wherein the ultraviolet-curable resin has a hydroxyl group.

7. The photocatalytic film according to claim 1, wherein
the ultraviolet-curable resin contains a polymerization initiator, and
the polymerization initiator is based on an acylphosphine oxide.

8. The photocatalytic film according to claim 1, wherein the hard coat layer has a thickness of 1 μm or larger and 10 μm or smaller.

9. The photocatalytic film according to claim 1, wherein the photocatalytic particles have an average particle diameter D50 of 10 nm or larger and 5000 nm or smaller.

10. The photocatalytic film according to claim 1, wherein the photocatalytic coat layer further contains a fluororesin.

11. The photocatalytic film according to claim 1, wherein the photocatalytic coat layer has a thickness of 0.1 μm or larger and 5.0 μm or smaller.

12. A display device comprising the photocatalytic film according to claim 1.

* * * * *